UNITED STATES PATENT OFFICE 2,311,401

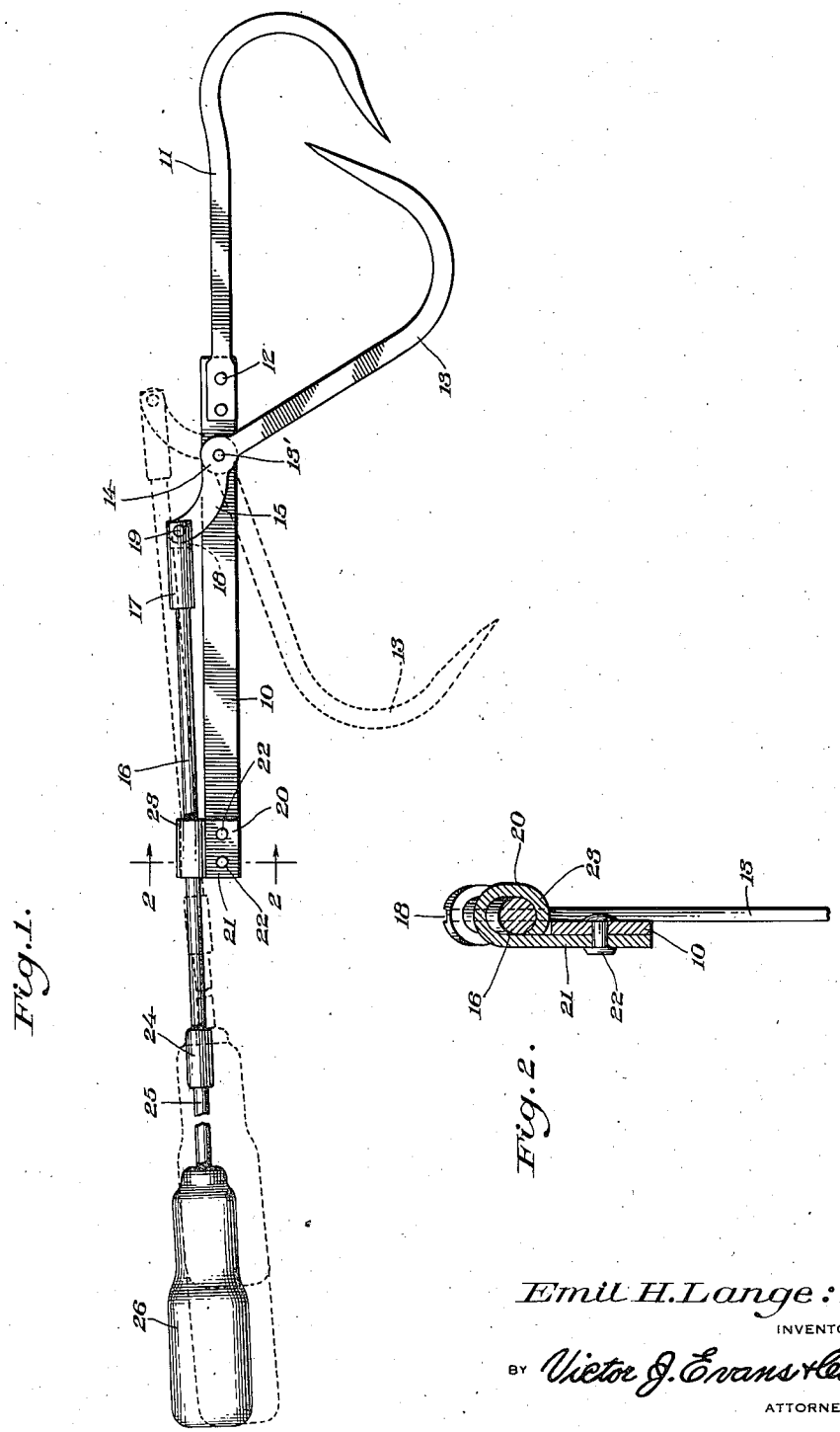

FISH GRAPPLE

Emil H. Lange, Lemont, Ill.

Application October 29, 1941, Serial No. 417,036

3 Claims. (Cl. 43—5)

This invention relates to fish grapples and has for an object to provide a simplified fish grapple which will be devoid of triggers, springs and other complicated parts.

A further object is to provide a fish grapple in which the secondary hook is operated with a lever instead of a spring, the lever being connected to a handle which is frictionally held in a guide on the bar to which the primary hook is attached so that the secondary hook will remain open until the primary hook is impaled in the fish and the handle given a jerk to impale the secondary hook in the fish.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a side elevation of a fish grapple constructed in accordance with the invention with the secondary hook shown in open position in dotted lines.

Figure 2 is a cross sectional view taken on the line 2—2 of Figure 1 showing the guide for frictionally engaging the handle of the secondary hook.

Referring now to the drawing in which like characters of reference designate similar parts in the various views, the grapple comprises a flat bar 10 to the outer end of which is secured a primary hook 11 having its bill inclined rearwardly and outwardly. The shank of the hook is secured to the bar by rivets 12, or other connectors.

A secondary hook 13 is pivoted to the bar 10 near the outer end thereof by a pivot pin 13' passed through an eye 14 formed on the shank of the secondary hook. The bill of the secondary hook is inclined upwardly and forwardly. The shank of the secondary hook is provided with an arcuate lever 15 which is formed integral at one end with the pivot eye 14 and is adapted to extend on the opposite side of the bar 10 from the secondary hook.

A rod 16 has fixed to its outer end a sleeve 17 provided with a bifurcation 18, shown best in Figure 2, to receive the free end of the lever 15. A pivot pin 19 is passed through the bifurcation and free end of the lever to pivotally secure the rod to the lever. The rod 16 is slidably mounted in a guide 20 formed from strap metal and including a shank 21 which is secured to the bar 10 by a rivet 22, or other connecter, and an elongated substantially elliptical eye 23 which extends laterally along the bar 10. The elliptical eye is resilient so that it grips the rod 16 with sufficient friction to yieldably hold the rod in position to normally hold the secondary hook in the open position shown by dotted lines in Figure 1, ready to impale a fish.

The rod is provided with a sleeve coupling 24 to receive a handle 25 which terminates in a grip 26.

In operation, with the secondary hook 13 in open position shown by dotted lines in Figure 1, the primary hook 11 is disposed on the opposite side of the fish from the fisherman. Then the grip 26 is given a quick jerk to impale the primary hook in the fish during the initial stages of the jerk, and since the primary hook is then held stationary, the remainder of the jerk on the rod 16 will swing the secondary hook on its pivot 13 and impale it in the side of the fish toward the fisherman.

From the above description it is thought that the construction and operation of the invention will be fully understood without further explanation.

What is claimed is:

1. A fish grapple comprising, a bar, a primary hook having its shank fixed to the outer end of the bar and having its bill inclined rearwardly and outwardly, a secondary hook pivoted to the bar near the outer end thereof and having its bill inclined upwardly and forwardly, an arcuate lever formed integral with the shank of the secondary hook at the pivot thereof and extending on the opposite side of the bar from the secondary hook, a rod extending along the bar and pivoted at the outer end to the free end of the lever, an elongated substantially elliptical resilient eye secured to the bar and frictionally receiving the rod to hold the secondary hook open with respect to the primary hook, and a grip secured to the rod for jerking the rod relatively to the bar to first impale the primary hook in a fish and subsequently impale the secondary hook in the fish.

2. A fish grapple comprising, a flat bar, a primary hook secured to the outer end of the bar having its bill inclined downwardly and rearwardly, a secondary hook pivoted to the bar at a point close to the outer end of the bar and having its bill inclined upwardly and forwardly, a lever integral with the pivoted end of the secondary hook and extending on the opposite side of the bar from the secondary hook, a guide eye secured to the bar, and a rod forming a handle pivoted at the forward end to the lever and slidably mounted in said eye, the rod being movable longitudinally with relation to the bar to effect the swinging of the secondary hook into open or closed position with relation to the primary hook.

3. A fish grapple, comprising a bar having a hook at its outer end inclined rearwardly and outwardly, a secondary hook pivoted to the bar in beyond the first hook and having its bill inclined upwardly and forwardly, a lever carried by the shank of the secondary hook and extending on the opposite side of the bar from the secondary hook, a rod pivoted at its outer end to the free end of the lever, a resilient holding means carried by the inner end of the bar and frictionally receiving the rod to hold the secondary hook open with respect to the first mentioned hook, and a grip secured to the inner end of the rod.

EMIL H. LANGE.